(12) United States Patent
Peura

(10) Patent No.: US 6,779,420 B2
(45) Date of Patent: Aug. 24, 2004

(54) INTEGRATED TWIN PULL ELECTRONIC TORQUE MANAGEMENT AXLE

(75) Inventor: Brent M. Peura, Farmington, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 0 days.

(21) Appl. No.: 10/102,371

(22) Filed: Mar. 20, 2002

(65) Prior Publication Data

US 2003/0177860 A1 Sep. 25, 2003

(51) Int. Cl.[7] ............................................. F16H 48/12
(52) U.S. Cl. ...................................... 74/650; 192/48.1
(58) Field of Search ......................... 74/650; 475/220, 475/222, 249; 192/48.1, 49, 48.2

(56) References Cited

U.S. PATENT DOCUMENTS

| | | | | |
|---|---|---|---|---|
| 2,060,558 A | * | 11/1936 | De Lavaud | 74/650 |
| 2,179,923 A | * | 11/1939 | De Lavaud | 74/650 |
| 3,546,968 A | * | 12/1970 | Altmann | 475/240 |
| 4,981,192 A | * | 1/1991 | Kurihara et al. | 180/247 |
| 5,189,930 A | * | 3/1993 | Kameda | 74/650 |
| 5,388,679 A | * | 2/1995 | Inoue et al. | 192/35 |
| 5,524,509 A | * | 6/1996 | Dissett | 74/650 |
| 5,540,119 A | * | 7/1996 | Hudson | 74/650 |
| 5,727,430 A | * | 3/1998 | Valente | 74/650 |
| 5,964,126 A | * | 10/1999 | Okcuoglu | 74/650 |
| 6,012,560 A | * | 1/2000 | Kuroda et al. | 192/35 |
| 6,237,735 B1 | * | 5/2001 | Walton et al. | 192/35 |
| 6,349,809 B1 | * | 2/2002 | Isley, Jr. | 192/35 |
| 6,533,090 B2 | * | 3/2003 | Osborn et al. | 192/48.2 |

FOREIGN PATENT DOCUMENTS

| | | | | |
|---|---|---|---|---|
| DE | 430321 | * | 6/1926 | 74/650 |
| GB | 2252801 A | * | 8/1992 | F16H/35/04 |

OTHER PUBLICATIONS

U.S. publication 2002/0125095 A1.*

* cited by examiner

Primary Examiner—Tisha D Lewis
(74) Attorney, Agent, or Firm—Jennifer M. Brumbaugh; Mick A. Nylander

(57) ABSTRACT

An axle module for use in an automotive vehicle. The axle module includes a housing and a ring gear assembly rotatably supported within the housing. The axle module also includes a shaft arranged within the ring gear assembly. The axle module further includes a clutch pack arranged within the ring gear assembly and in an expansion unit arranged adjacent to the shaft and the housing. The axle module also includes a motor which is used to control the transfer of an axial torque through the clutch pack and plurality of plates.

16 Claims, 3 Drawing Sheets

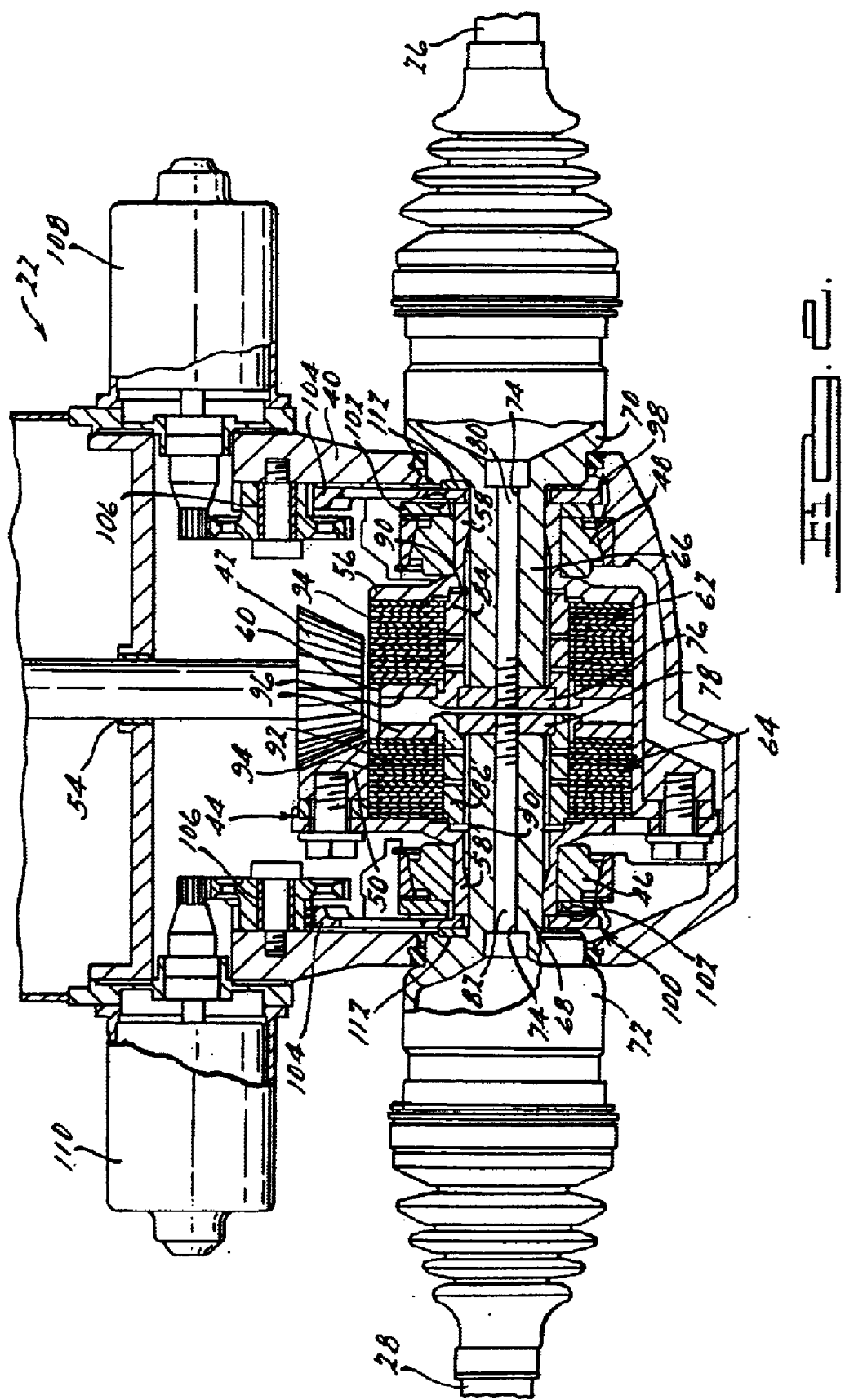

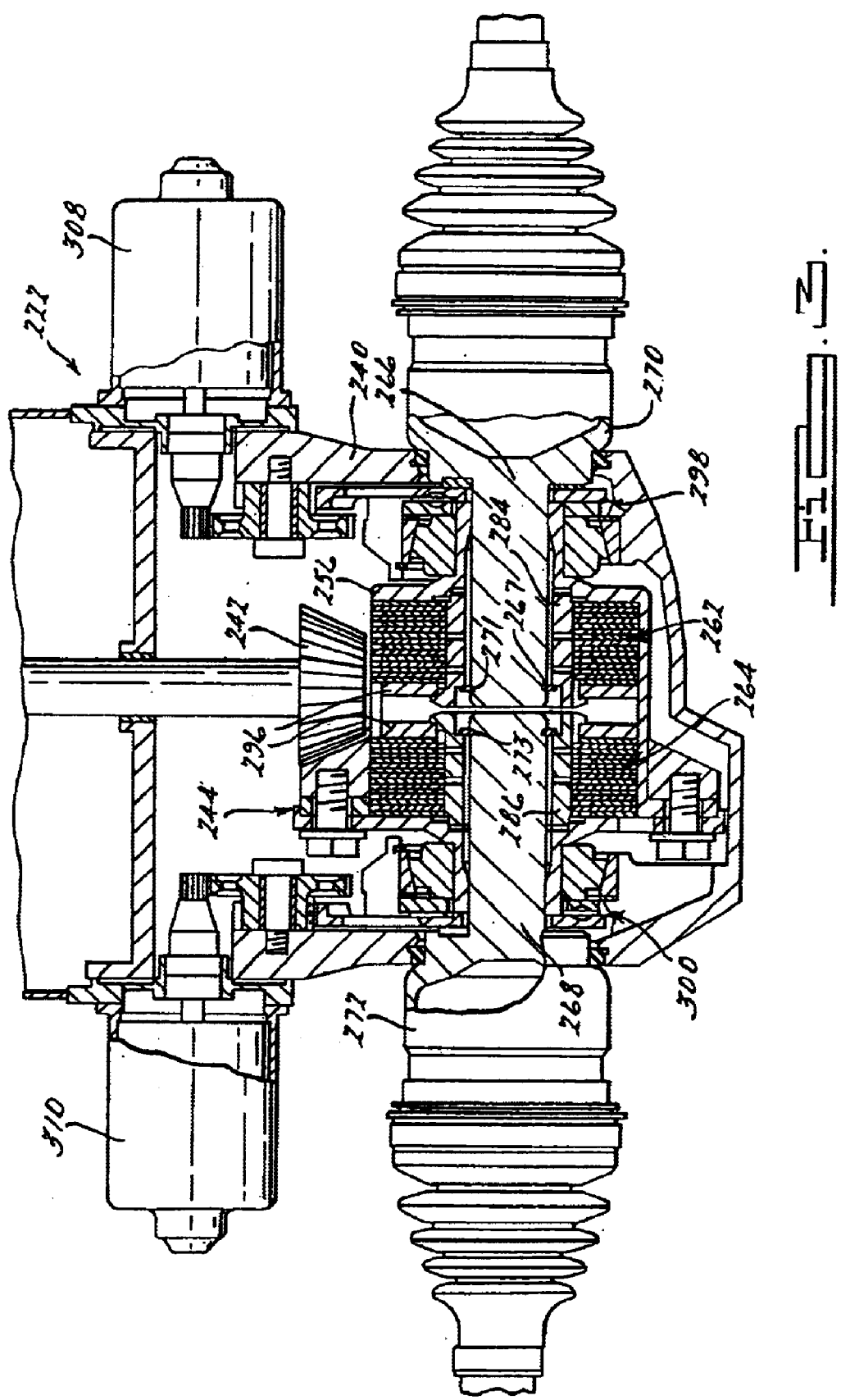

INTEGRATED TWIN PULL ELECTRONIC TORQUE MANAGEMENT AXLE

TECHNICAL FIELD

The present invention relates to axles and differential drives for motor vehicles and more particularly, relates to an axle module with twin pull electronic torque management for use in a vehicle.

BACKGROUND OF THE INVENTION

Torque distribution systems in automotive vehicles have been known for many years. Generally, torque distribution devices either control the torque being transferred to an axle as found in an in-line "hang-on" all wheel drive system, or may even control the torque being transferred to each individual wheel, as found in a twin "hang-on" all wheel drive system. In the twin "hang-on" all wheel drive system there is typically a primary driven axle and a secondary driven "hang-on" axle that is connected via prop shaft or drive shaft and torque transfer coupling to the primary driven axle. The primary driven axle also includes a differential which divides the torque to the side shaft of each axle and then to the wheels. The division of torque between the primary and secondary axles is controlled by the torque transfer coupling which is usually integrated in the secondary axle.

A typical prior art twin "hang-on" all wheel drive system provides a permanent drive primary axle. However, when the primary axle starts to slip, i.e. the wheels are on a slick road condition or loose gravel, etc., the prior art systems apply torque to each wheel of the secondary axle until the appropriate wheel torque is achieved. This provides a traction performance advantage over in-line "hang-on" torque distribution systems under slip conditions similar to that of a limited slip differential. It should be noted that the twin torque distribution systems eliminate any need for a differential gear set within the secondary axle.

However, with the increased traction performance of the prior art systems, a substantial number of drawbacks are encountered such as complexity of the torque distribution system, the weight of the torque distribution system and the cost to manufacture and design such systems. Furthermore, the prior art torque distribution systems generally have axles that are bulky and difficult to package in the small area left for the driveline systems. Also, the increased cross vehicle width of most twin axles causes the inboard side shaft joints to be positioned or shifted towards the wheel, thus leading to packaging conflicts with the chassis components and an increase in joint angles which effects the efficiency and durability of constant velocity joints and the like. In the recent past there have been numerous attempts to over come the above-identified problems in the area of conventional driveline systems. Most of these systems have tried to develop a method to reduce the mass, packaging requirements and joint angles of conventional axles by integrating the inboard side shaft joints and the differential housing. However, no such integration with a twin axle including speed sensing or electronically controlled clutch packs, have been provided to date.

Therefore, there is a need in the art for an axle module that includes an integration of joints into a smaller package, having reduced weight and lower side shaft joint angles within the torque distribution system that also still provides the improved traction performance demanded by all wheel drive systems. Furthermore, there is a need in the art for a torque distribution system that can electronically be controlled thus providing for tuning of each desired vehicles handling and performance requirements.

SUMMARY OF THE INVENTION

One object of the present invention is to provide an improved torque distribution system.

Another object of the present invention is to provide an integrated axle module that includes twin electronic torque management units.

Yet a further object of the present invention is to reduce the weight and packaging requirements for an axle module in an automotive vehicle.

Another object of the present invention is to provide a torque distribution system that electronically controls the tuning for the desired vehicle handling and performance requirements.

It is still a further object of the present invention to provided an axle module that is capable of twin axle preemptive locking measures.

It is still a further object of the present invention to provide a torque distribution system that is driven directly from the transmission.

To achieve the fore going objects the axle module for use in vehicle includes a housing. The housing has a ring gear assembly rotatably arranged within the housing. The axle module also includes a shaft arranged within the ring gear assembly. A clutch pack unit is arranged within the ring gear assembly of the axle module. The axle module also includes an expansion unit arranged adjacent to the shaft and the housing.

One advantage of the present invention is a new and improved torque distribution device for a vehicle.

A further advantage of the present invention is that the integrated axle module improves traction while reducing the weight and packaging requirements within the drivetrain system.

A further advantage of the present invention is that the axle module is capable of independently controlling each wheels distributed torque via a motor.

Another advantage of the present invention is that the integrated axle module can be tuned for the desired vehicles handling and performance requirements.

Yet a further advantage of the present invention is that the integrated axle module can be used as a preemptive blocking device for each axle and wheel independently of each other wheel.

Still a further advantage of the present invention is that the prop shaft is driven directly from the transmission thus removing the need for a torque transfer coupling.

Other objects, features and advantages of the present invention will become apparent from the subsequent description and the appended claims, taken in conjunction with the accompanying drawings.

BRIEF DESCRIPTION OF THE DRAWINGS

FIG. 2 shows a cross section of the axle module according to the present invention.

FIG. 3 shows a cross section of an alternate embodiment of the axle module according to the present invention.

Figure 1:
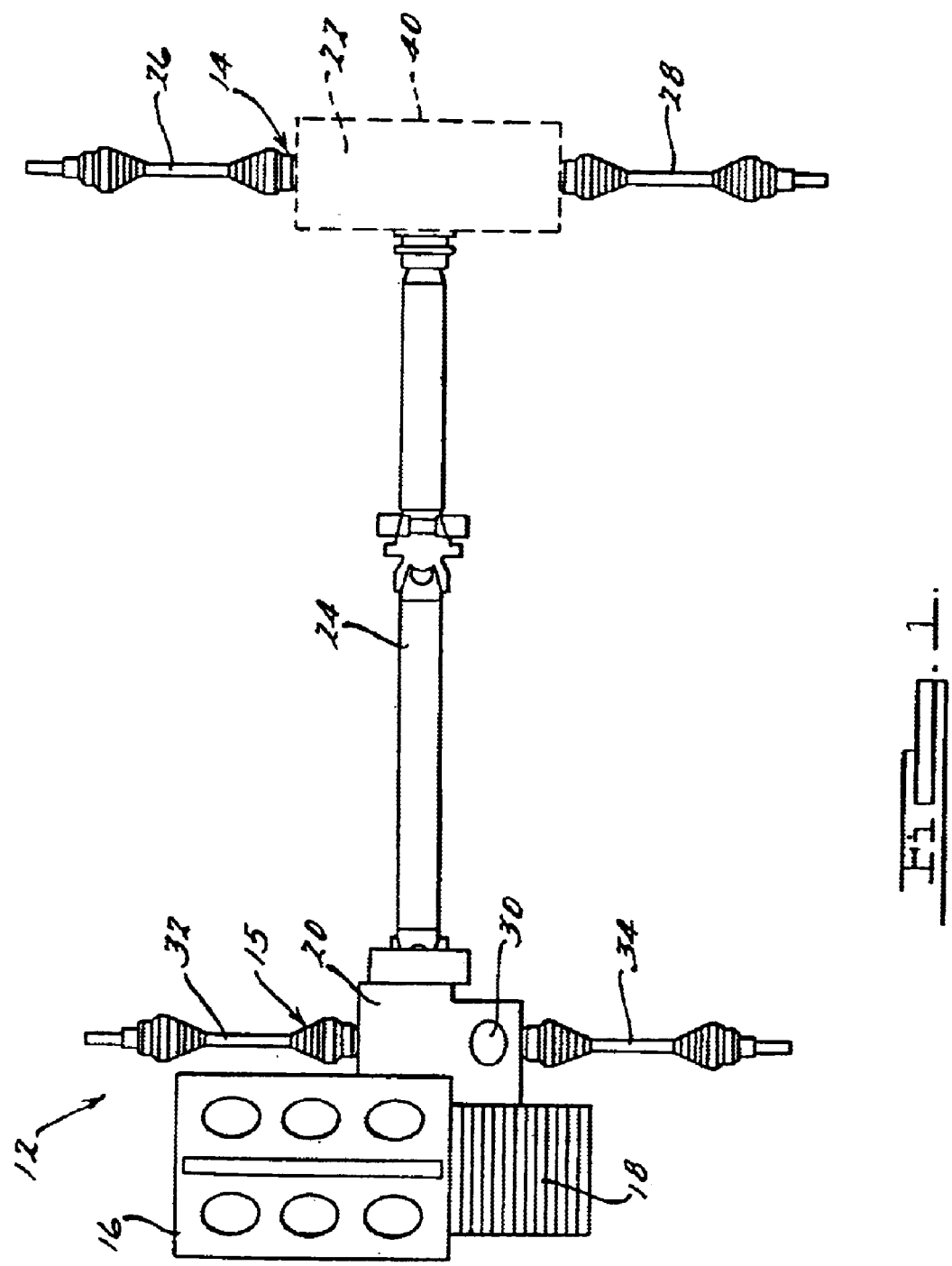
FIG. 1 shows a schematic view of a vehicle system according to the present invention.

BEST MODE OF CARRYING OUT THE INVENTION AND DESCRIPTION OF THE PREFERRED EMBODIMENT(S)

Referring to the drawings, an integrated axle module 22 according to the present invention is shown. FIG. 1 schematically illustrates an all wheel drive or four wheel drive motor vehicle 12 that is primarily front wheel driven, however the present invention can also be used on a primary rear wheel driven vehicle.

A motor vehicle 12 as shown in FIG. 1 is permanently driven by a front axle 15. The motor vehicle 12 is driven by power transferred from the engine 16 through a transaxle trans or gear box 18 which may be either an automatic or manual gear box. The power from the gear box 18 enters the power take off 20 of the drivetrain assembly and finally on through to the front differential 30. When there is a demand for power, it is transferred to the rear axle module 22 via a propeller shaft or driving shaft 24. At the rear axle module 22 power splits to a left hand rear side shaft 26 and a right hand rear side shaft 28 for distribution to the wheels at the rear of the vehicle. The front differential or front axle module 30 distributes torque between the left hand front side shaft 32 and the right hand front side shaft 34. In an all wheel drive vehicle, power is delivered to both the rear axle module 22 and the front differential 30, the front axle 15 is a primarily driven axle, while the rear axle 14 only receives power when needed. One embodiment on the present invention is an all wheel drive vehicle wherein torque is distributed to each wheel of the secondary axle in an independent manner depending on which wheels are in a slip condition or in a non slip condition with respect to the road. The integrated axle module 22 of the present invention could be used in either the front or rear axle of an all wheel drive unit or even in both the front and rear axle.

The integrated axle module 22 includes a housing 40. One end of the prop shaft 24 includes a pinion gear 42 which is rotatably supported by the axle module housing 40 and provides the necessary power needed to spin the side shafts 26,28 and each wheel.

FIG. 2 shows a cross section of the integrated axle module 22 according to the present invention. The axle module 22 includes a housing 40. The housing 40 includes at least one end plate on an end thereof. A ring gear assembly 44 is rotatably supported within the housing 40 by a first 46 and second set of bearings 48. The ring gear assembly 44 has a ring gear 50 attached to an outer surface thereof by any means known. The ring gear 50 is positioned within the housing 40 such that it mates with and engages with a pinion gear 42 which is attached to one end of the propeller shaft 24 of the drivetrain system. The pinion gear 42 is rotatably supported by the housing 40 and a bearing 54. The pinion gear 42 rotates at the prop shaft speed which is driven directly from the transmission. The prop shaft 24 rotates with an average speed that is the front wheel speed minus any reduction ratio in the necessary gearing. The pinion gear 42 rotating at this speed will rotate the ring gear 50, thus providing the rotary motion necessary for the rotatably supported ring gear assembly 44 within the axle module 22. The ring gear assembly 44 generally has an outer hub 56 with a cylindrical appendage 58 extending from each end of the outer hub 56. The outer hub 56 of the ring gear assembly 44 is supported by the first 46 and second bearing 48 and the housing 40. The outer hub 56 helps in supporting a first 26 and second shaft 28 in each end thereof. The outer hub 56 also includes a spline 60 on an inside surface thereof such that a first 62 and second clutch pack 64 engage with the spline 60.

A first 66 and second stub shaft 68 is arranged within the ring gear assembly 44. The first and second stub shafts 66,68 have a plurality of teeth on an outside surface thereof. In one embodiment the stub shafts 66,68 have an integral side shaft joint 70,72 on one end thereof. The stub shafts 66,68 also include an orifice 74 therethrough a centerline of the stub shaft. The orifice 74 is generally cylindrical in shape. The constant velocity or side shaft joints 70,72 receive and rotatably secure a side shaft 26,28 on each end thereof, wherein the side shaft 26,28 then connects to a wheel on its other end. The side shaft joints 70,72 which are integral with the stub shafts 66,68 of the above-identified invention are rotatably supported at the side shaft joints 70,72 in the housing 40 by any known bearing method. In one embodiment a securing means, i.e. bolts 80,82, are placed through the orifices 74 in the stub shafts 66,68 such that nuts 76,78 are connected to the end of the bolts 80,82 on one end of the stub shafts 66,68 opposite the side shaft joints 70,72. The nuts 76,78 are used in one embodiment to secure the bolts 80,82 within the stub shafts 66,68, however in another embodiment any other type of securing nut like device may be used to connect with a bolt or other device place through the orifices 74.

A first 84 and second inner hub 86 are then arranged around the first 66 and second stub shafts 68, respectively. The inner hubs 84,86 have a plurality of teeth on an inner surface thereof which mate with and are rotatably fixed with the teeth on the outer surface of the stub shafts 66,68. This allows the inner hubs 84,86 to spin with the stub shafts 66,68. The inner hubs 84,86 are axially fixed to the outer surface of the stub shafts 66,68. A return spring 90 is placed between the inner hubs 84,86 on one end thereof and the outer hub 56 of the ring gear assembly 44. The return spring 90 will act to axially separate the inner hubs 84,86 from the outer hub 56.

Clutch packs 62,64 are arranged within the ring gear assembly 44. The clutch packs 62,64 are arranged such that they engage the spline 60 on the outer hub 56 of the ring gear assembly 44 on an outer circumference thereof and on the inner circumference of the clutch packs 62,64 they engage a spline of the inner hubs 84,86. The clutch packs 62,64 include a plurality of friction plates 92,93 alternately arranged and alternately connected to either the outer hub 56 or the inner hubs 84,86 of the ring gear assembly 44. The plurality of plates 92 that are connected to the inner hubs 84,86 are rotatably connected to the inner hubs 84,86 via a spline. This will keep the friction plates 92 that are connected to the inner hubs 84,86 rotatably fixed with respect to the inner hubs 84,86 while allowing for axial movement of the friction plates 92 along the outer surface of the inner hubs 84,86. The friction plates 94, which in an alternating sequence with the plates 92 connected to inner hubs 84,86, are connected to the outer hub 56 and are rotatably fixed with respect to the outer hub 56 by the spline 60. The friction plates 94 connected to the outer hub 56 are capable of axial movement along the outer hub 56 inner surface. The clutch packs 62,64 are in contact with the outer hub 56 of the ring gear assembly 44 on one side thereof and with a thrust ring 96 on the opposite side thereof. The thrust ring 96 is also in contact with a surface of the inner hubs 84,86. Therefore, the inner hubs 84,86 and stub shafts 66,68 are both capable of axial movement within the outer hub 56 of the ring gear assembly 44. In operation the clutch packs 62,64 which are connected to the first and second inner hub 86, respectively, are compressed via the thrust ring 96 such that the friction plates 92,94 for each clutch pack compresses and creates friction between the alternating plates 92,94 thus creating a torque transfer from the outer hub 56 and input pinion gear 42 to one or both of the inner hubs 84,86 of the stub shafts 66,68.

A first 98 and second expansion device 100 is arranged between the first 66 and second stub shaft 68 and the ring gear assembly outer hub 56 or the housing 44 of the axle module 22. The expansion devices 98,100 in one embodiment is a ball ramp expansion mechanism, however, it should be noted that any other type of expansion mechanism such as one that uses inclined surfaces and/or any other type of an expansion mechanism that can convert rotary motion into an axial force or motion can be used. The ball ramp expansion mechanisms 98,100 generally include a first 102 and second ramp 104 that has a plurality of balls 106 dispersed between first 102 and second ramp 104 surfaces. The first ramp 102 is fixed with respect to the housing 40 while the second ramp 104 engages a gear set 106. The gear sets 106 also engage with drive motors 108,110. It should be noted that a first 108 and second motor 110 is used to independently control the first 62 and second clutch packs, respectively. A needle or thrust bearing 112 is located between the first ramp 102 of the ball ramp expansion mechanism and a surface of the stub shafts or side shaft joint members 70,72. This will allow for easier rotation of the second ball ramp 104 when the drive motors 108,110 delivers the rotary force to the second ball ramp 104. The gear set 106 is used such that the response time of the motors 108,110 is reduced, by having the gear set 106 create a greater rotational force than that originally developed by the drive motors 108,110.

The drive motors 108,110 are independently activated by an on board system computer. The on board system computer is connected to a controller which based on an algorithm and sensor inputs sends current to the drive motors 108,110 based on need. Once the algorithm determines if a wheel is in a slip condition the on board system computer will send the necessary signal to the drive motors 108,110 which will then send the necessary rotational torque to activate either or both of the clutch packs 62,64. The drivetrain system has the capability of each independent motor 108,110 being separately regulated by a controller of the automotive vehicle. Hence, the torque transmission to each wheel is independently controlled regardless of what the other three wheels in the automotive vehicle are doing. In one embodiment the motors 108,110 are attached to an outer surface of the axle module housing 40. It should further be noted that both the right hand 26 and left hand side shafts 28 can be actuated independently with each motor and in any range varying from a slight drag to maximum clutch pack capacity.

FIG. 3 shows an alternate embodiment of the integrated axle module 22 according to the present invention. It should be noted that like numerals indicate like parts. The axle module 222 is set up in the same manner as that shown in FIG. 2 except that the stub shafts 266,268 which are arranged within the ring gear assembly 244 are either hollow or solid. The end of the first 266 and second stub shafts 268 include a circular channel 267 therein and within that channel 267, is a first 271 and second retaining ring 273 which are used to connect the stub shafts 266,268 to the inner hubs 284,286 with respect to axial motion. Therefore, this will allow for axial movement of the inner hubs 284,286 because of the forces acting on the stub shafts 266,268 from the ball ramp units 298,300. This movement in the axial direction of the shafts 266,268 and hence the inner hubs 284,286 will compress the clutch packs 262,264 such that the clutch packs interact between the pressure ring 296 and the outer hub 256, thus transferring torque from the outer hub 56 to the inner hubs 284,286 of the axle module 222. When the motors 308,310 are activated the clutch packs 262,264 are engaged, thus transferring torque between the outer hub 256 and the inner hubs 284,286 of the first 266 and second stub shafts it should be noted that this movement puts the stub shafts 266,268 are axially tension.

In operation the integrated axle module 22 with twin pull electronic torque management is controlled by the on board computer control system and controllers. Generally, each side shaft 26,28 and each wheel of an automotive vehicle will have a plurality of sensors monitoring numerous factors such as speed, if a vehicle wheel is slipping, if the vehicle wheel is braking, steering angle, yaw rate, throttle, if the vehicle is in a turn and a host of other identifiable factors that affect the handling and traction of the automotive vehicle. A specific example might be that the on board computer senses through its sensor network that a particular wheel in the secondary axle is in a spin condition and then will, via its controller activate the individual motor 108,110 on the wheel opposite of the spinning wheel to engage, hence sending more torque from the propeller shaft 24 to the wheel that is in a non slip condition, thus allowing the vehicle to recover from the slip condition. This will occur by having the motor 108,110 activate and rotate the gear set such that the second ramp 104 of the ball ramp unit will rotate a predetermined distance based on the gearing used in the gear set. This then will cause the balls to engage with the first ramp 102 and create an axial force by separating the ramps 102,104. This axial force is then transfered via the second ramp 104 to the stub shaft 66,68. The stub shaft 66,68 will then move in a axial direction thus pulling the stub shaft 66,68 in an outer direction and engaging the inner hub 84 against its pressure ring 96 and the pressure ring 96 in turn against the clutch pack friction plates 92,94. The axial pull of the stub shaft 66,68 puts the shaft in tension. When the friction plates 92,94 come in contact with one another and compress into one another the outer hub 56 of the ring gear assembly 44, which is spinning at the axle speed via the pinion gear and ring gear, will begin transferring that input torque through the friction plates 92,94 to the inner hub 84 thus creating more torque to the side shaft 26,28 that has the electric motor 108,110 engaged and removing the vehicle from the slip condition in a quicker time period. Once the slip condition has been over come and the vehicle wheels are running at equilibrium the motor 108 or 110 will be disengaged such that the ball ramp unit 98 or 100 is rotated in a reverse motion such that the first 102 and second ball ramps 104 are at there narrowest width thus disengaging the friction plates 92,94 and allowing the torque to be distributed evenly between the side shafts 26,28. The return spring 90 will also help in returning the ball ramp unit to equilibrium in a shorter time frame. The side shafts 26,28 will have an equilibrium speed at which they will spin when the clutch packs 62,64 are not engaged.

It should be noted that in operation the motors 108,110 can also act as an electronic cut off unit by disconnecting the clutch pack 62,64 in an open position at all times, thus keeping the ball ramp 98 or 100 at its narrowest position and allowing no torque transfer between the outer hub 56 and the inner hubs 84,86. Therefore, no torque is being sent to the wheels and the wheels roll along at hang on speed. The motor 108,110 is also capable of allowing only a certain percentage of power to be sent to each wheel depending on the road conditions and what is being sensed by the on board computer sensors. Therefore, at equilibrium conditions the secondary axle side shafts 26,28 spin at axle speed and the pinion gear 42 will be spinning the ring gear 50 and hence the ring gear assembly 44 at axle speed but there will be no torque or power transfer through the clutch packs 62,64 until a condition occurs that requires more torque to be transferred from the primary driven axle to the secondary axle.

The present invention has been described in an illustrative manner. It is to be understood that the terminology which has been used is intended to be in the nature of words of description rather than of limitation.

Any modifications or variations of the present invention are possible in light of the above teachings. Therefore, within the scope of the appended claims, the present invention maybe practiced otherwise then as specifically described.

What is claimed is:

1. An axle module, said module including:
   a housing;
   a ring gear assembly rotatably arranged within said housing;
   a shaft arranged within said ring gear assembly;
   a clutch pack arranged within said ring gear assembly;
   an inner hub rotatably fixed to said shaft, said inner hub engaging a pressure ring on one side of said pressure ring, an opposite side of said pressure ring engaging said clutch pack, said inner hub transfers an axial force to said pressure ring at predetermined conditions; and
   an expansion unit arranged adjacent to said shaft and said housing.

2. The module of claim 1 wherein said clutch pack having a plurality of plates extending from said inner hub and said ring gear assembly in an alternating pattern, said plates are rotatably fixed to said inner hub and said ring gear assembly, respectively.

3. The module of claim 1 wherein said shaft having a side shaft joint integrated on one end thereof.

4. An axle module, said module including:
   a housing;
   a ring gear assembly rotatably arranged within said housing;
   a shaft arranged within said ring gear assembly;
   a clutch pack arranged within said ring gear assembly;
   an inner hub rotatably fixed to said shaft, said inner hub engaging a pressure ring on one side of said pressure ring, an opposite side of said pressure ring engaging said clutch pack, said shaft having an orifice therethrough, a securing member arranged in said orifice, said securing member contacting said inner hub on one end thereof; and
   an expansion unit arranged adjacent to said shall and said housing.

5. An axle module, said module including:
   a housing;
   a ring near assembly rotatably arranged within said housing;
   a shaft arranged within said ring gear assembly;
   a clutch pack arranged within said ring gear assembly;
   an inner hub rotatably fixed to said shaft, said inner hub engaging a pressure ring on one side of said pressure ring, an opposite side of said pressure ring engaging said clutch pack, said shaft having a retaining ring on one end thereof, said retaining ring engaging said inner hub; and
   an expansion unit arranged adjacent to said shaft and said housing.

6. An axle module, said module including:
   a housing;
   a ring gear assembly rotatably arranged within said housing;
   a shaft arranged within said ring gear assembly;
   a clutch pack arranged within said ring gear assembly; and
   an expansion unit arranged adjacent to said shaft and said housing, said expansion unit having a ball ramp expander, said ball ramp expander provides axial force, said ball ramp expander transfers an axial load to said shaft, said shaft transfers said axial load to an inner hub, said shaft axially moves with respect to said housing.

7. The module of claim 6 further including a drive motor connected to said housing, said drive motor having a reduction gear.

8. The module of claim 7 wherein said reduction gear engages said ball ramp expander.

9. The module of claim 6 wherein said inner hub axially moves a thrust ring into said clutch pack, said clutch pack is compressed against said ring gear assembly, said clutch pack transfers an input torque from said ring gear assembly to said inner hub.

10. An axle module for use in a vehicle, said module including:
    a housing;
    a ring gear assembly rotatably supported within said housing;
    a pinion gear engaged with said ring gear assembly;
    a shaft arranged within said ring gear assembly;
    an inner hub rotatably fixed to said shaft;
    a clutch pack contacting said ring gear assembly and said inner hub, said clutchpack having a plurality of friction plates, a portion of said friction plates connected to said ring gear assembly and another portion of said friction plates connected to said inner hub, said connection to said ring gear assembly and said inner hub having an alternating pattern;
    a pressure ring arranged between said inner hub and said clutch pack, said inner hub transfers an axial force to said pressure ring at predetermined conditions; and
    an expansion unit arranged adjacent to said shaft and said housing.

11. The module of claim 10 wherein said shaft having a side shaft joint integrated on one end thereof.

12. An axle module for use in a vehicle, said module including:
    a housing;
    a ring gear assembly rotatably supported within said housing;
    a pinion gear engaged with said ring gear assembly;
    a shaft arranged within said ring gear assembly;
    an inner hub rotatably fixed to said shaft, said shaft having an orifice therethrough and a securing member arranged within said orifice, said securing member contacting said inner hub on one end;
    a clutch rack contacting said ring gear assembly and said inner hub, said clutchpack having a plurality of friction plates, a portion of said friction plates connected to said ring gear assembly and another portion of said friction plates connected to said inner hub, said connection to said ring gear assembly and said inner hub having an alternating pattern;
    a pressure ring arranged between said inner hub and said clutch pack,; and
    an expansion unit arranged adjacent to said shaft and said housing.

13. An axle module for use in a vehicle, said module including:
- a housing;
- a ring gear assembly rotatably supported within said housing;
- a pinion gear engaged with said ring near assembly;
- a shall arranged within said ring gear assembly;
- an inner hub rotatably fixed to said shaft, said shall having a retaining ring on one end thereof, said retaining ring engaging said inner hub;
- a clutch pack contacting said ring gear assembly and said inner hub, said clutch pack having a plurality of friction plates, a portion of said friction plates connected to said ring gear assembly and another portion of said friction plates connected to said inner hub, said connection to said ring gear assembly and said inner hub having an alternating pattern;
- a pressure ring arranged between said inner hub and said clutch pack; and
- an expansion unit arranged adjacent to said shall and said housing.

14. The module of claim 11 wherein said expander unit having a ball ramp expander, said ball ramp expander produces an axial force.

15. The module of claim 14 further including a drive motor connected to said housing and electrically connected to a controller, said drive motor having a reduction gear engaged with said ball ramp expander.

16. An axle module for use in a vehicle to control power transmitted to a specific wheel independently, said axle module including;
- a housing;
- a ring gear assembly rotatably supported within said housing;
- a pinion gear engaging said ring gear assembly;
- a first and second stub shaft arranged within said ring gear assembly;
- a first and second inner hub rotatably fixed to said first and second stub shaft, respectively;
- a first and second clutch pack arranged within said ring gear assembly, said first and second clutch pack contacting said first and second inner hub respectively, said first and second clutch pack having a first and second plurality of friction plates;
- a first and second thrust ring engaging said first and second inner hub and said first and second plurality of friction plates, respectively;
- a first and second ramp assembly adjacent to said housing and said first and second stub shaft, respectively, said first and second ramp assemblies transfer an axial load to said first and second stub shafts, respectively, said stub shafts transfer said axial loads to said inner hub, said stub shafts axially move with respect to said housing;
- a first and second drive motor controlling said first and second ramp assembly, respectively; and
- a first and second side shaft connected to said first and second stub shaft, respectively, each of said motors independently controlling power to a predetermined side shaft.

\* \* \* \* \*

UNITED STATES PATENT AND TRADEMARK OFFICE
CERTIFICATE OF CORRECTION

PATENT NO. : 6,779,420 B2
APPLICATION NO. : 10/102371
DATED : August 24, 2004
INVENTOR(S) : Brent M. Peura It is certified that error appears in the above-identified patent and that said Letters Patent is hereby corrected as shown below:

Column 8, Line 56: Delete "rack" and insert --pack--

Column 9, Line 7: Delete "shall" and insert --shaft--

Signed and Sealed this

Eighth Day of January, 2008

JON W. DUDAS
*Director of the United States Patent and Trademark Office*